(12) United States Patent
Furuhashi

(10) Patent No.: US 6,205,101 B1
(45) Date of Patent: Mar. 20, 2001

(54) IMAGE PROCESSING APPARATUS AND METHOD

(75) Inventor: Makoto Furuhashi, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/078,677

(22) Filed: May 14, 1998

(30) Foreign Application Priority Data

May 16, 1997 (JP) .................................................. 9-126677
Aug. 27, 1997 (JP) .................................................. 9-230912

(51) Int. Cl.$^7$ ........................................................ G11B 7/00
(52) U.S. Cl. .............................................. 369/58; 369/47
(58) Field of Search ................................... 369/58, 59, 47, 369/48, 49, 50, 54, 44.37, 112, 100, 32

(56) References Cited

U.S. PATENT DOCUMENTS 5,270,879 * 12/1993 Shima et al. ........................ 369/58 X
5,563,859 * 10/1996 Masuda et al. ...................... 369/58 X

* cited by examiner

*Primary Examiner*—Muhammad Edun
(74) *Attorney, Agent, or Firm*—Lerner, David, Littenberg, Krumholz & Mentlik, LLP

(57) ABSTRACT

An image processing apparatus includes two devices which reproduce data on a disk. The devices operate independently of one another, thereby enabling image data from the disks to be processed rapidly.

32 Claims, 9 Drawing Sheets

IMAGE PROCESSING APPARATUS AND METHOD

BACKGROUND OF THE INVENTION

1. Field of the Invention

The present invention relates to an image processing apparatus and method, and particularly relates to an image processing apparatus and method whereby graphics data can be processed at higher speeds.

2. Description of the Related Art

FIG. 9 shows an example of a configuration of a computer game apparatus as a known image processing apparatus. Program data, graphics data, sound data, etc. is written to the CD-ROM 1. The pick-up 3 of the disk reproducing device 2 irradiates the CD-ROM 1 with a laser beam, and reproduces the data written in the CD-ROM 1, and outputs this data to the amplifying circuit 4. The amplifying circuit 4 amplifies the reproduced signals output from the pick-up 3, and outputs this to the signal processing circuit 5. The signal processing circuit 5 performs demodulation, decoding, error correction and the like to the reproduced signals supplied from the amplifying circuit 4, and then outputs the signals from the host bus 9 to the CPU 10, via the host interface 6.

Also, the micro-computer 7 of the disk reproducing device 2 monitors the output of the signal processing circuit 5, and controls the operation thereof. Further, the micro-computer 7 controls the servo circuit 8, and causes the servo circuit 8 to actuate the tracking servo, the focus servo, and the spindle servo.

The main memory 11 stores the data supplied from the disk reproducing device 2 via the host bus 9. The graphics processor 12 receives supply of the graphics data out of the data written to the main memory 11, provides this to the graphics memory 13 and stores the same, and also processes the graphics data and outputs to an unshown CRT or the like as video output. The sound processor 14 receives supply of the sound data out of the data written to the main memory 11, provides this to the sound memory 15 and stores the same, and also processes the sound data and outputs to an unshown speaker or the like as audio output.

The user operating an unshown operating unit causes a signal corresponding with that operation to be input to the CPU 10. The CPU 10 accordingly controls the disk reproducing device 2 to read the data stored in the CD-ROM 1, and store this data in the main memory 11. Of the data stored in the main memory 11, program data is supplied to the CPU 10, graphics data is stored in the graphics memory 13 via the graphics processor 12, and sound data is stored in the sound memory 15 via the sound processor 14.

The CPU 10 controls each unit according to the input program data. The graphics processor 12 processes graphics data stored in the graphics memory 13 to generate and output video data. The sound processor 14 processes sound data stored in the sound memory 15 to generate and output audio data.

Now, with such computer games, there is the need to move the pick-up 3 to a desired position on the CD-ROM 1 as the situation calls for. However, there is a problem in that the time required to move the pick-up 3 to the desired position (the seek time) is relatively long, making for poor random-accessibility. Further, there is a problem in that the transfer speed of the CD-ROM 1 is slow compared with that of a hard disk or the like, making the time until completion of data reading by the CPU 10 (the access time) longer. Consequently, it has been difficult to provide motion images which change at high speed.

SUMMARY OF THE INVENTION

The present invention has been made in Light of the above problems, and accordingly, it is an object of the present invention to provide motion image data which changes at high speed.

To this end, according to a first aspect of the present invention, an image processing apparatus for reproducing and processing data recorded on a disk comprises: a first reproducing unit for reproducing data recorded on a disk; a second reproducing unit for reproducing data recorded on the disk independently from the first reproducing unit; a graphics processing unit for processing the graphics data of the data reproduced by the first or second reproducing unit; and a control unit for controlling the reproducing operations of the first reproducing unit and the second reproducing unit.

Also, according to another aspect of the present invention, an image processing method for reproducing and processing data recorded on a disk: reproduces data recorded on a disk with a first reproducing unit; reproduces data recorded on a disk with a second reproducing unit independently from the first reproducing unit; and processes the graphics data of the data reproduced by the first or second reproducing unit.

DESCRIPTION OF THE PREFERRED EMBODIMENTS

Figure 1:
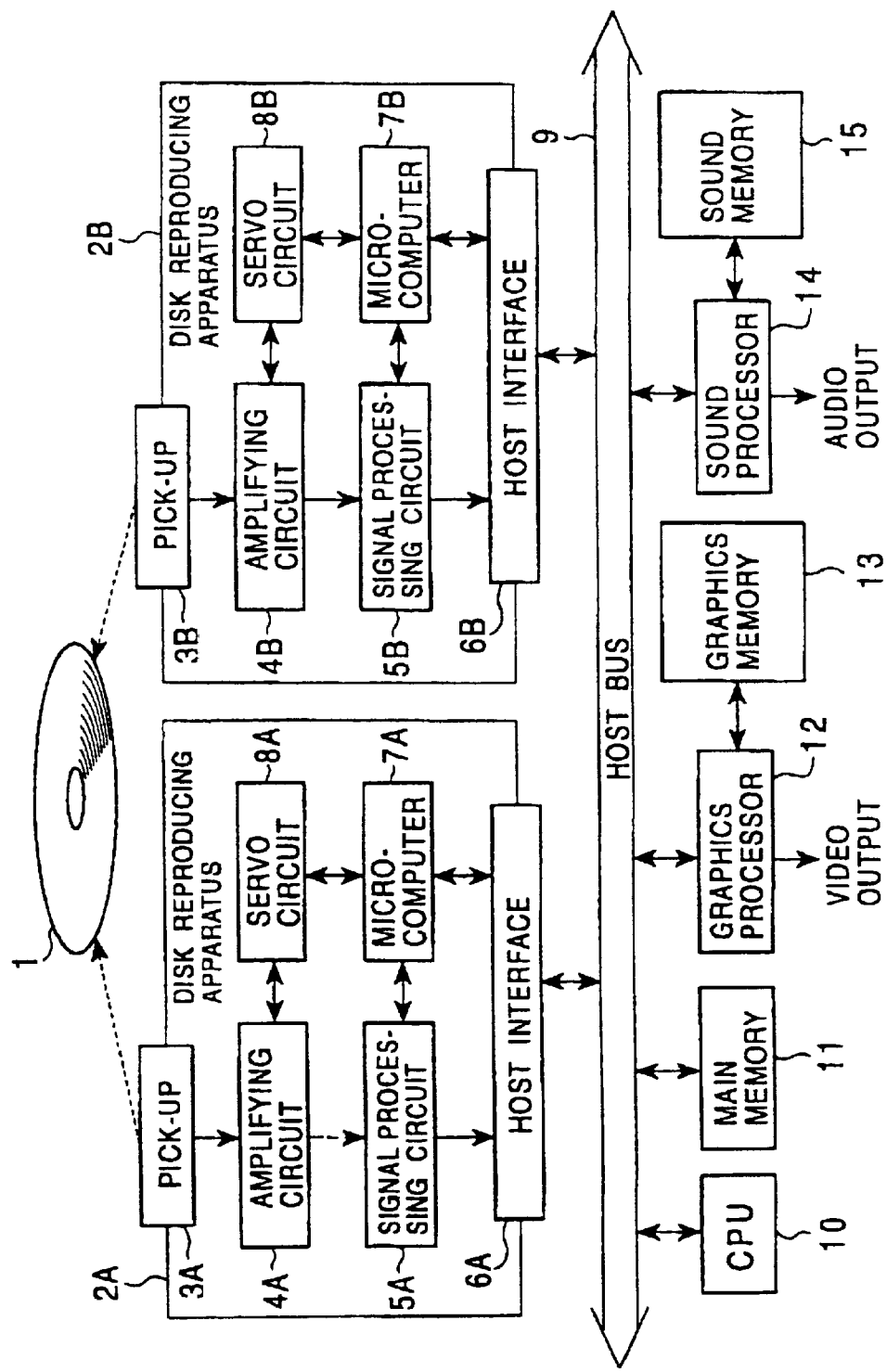
FIG. 1 is a block diagram showing a configuration example of a computer game apparatus to which the image processing apparatus according to the present invention has been applied.
Figure 9:
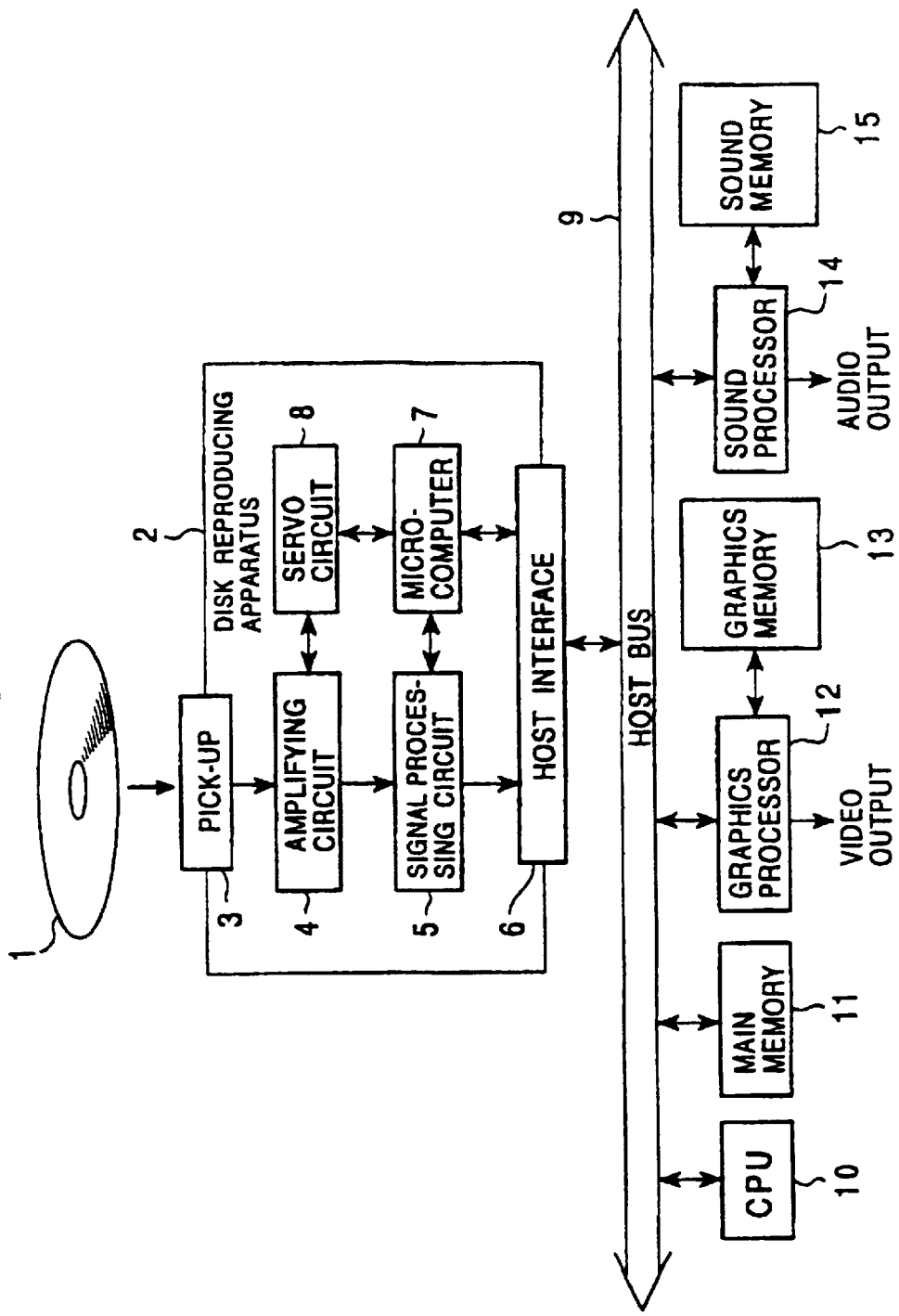
FIG. 9 is a block diagram illustrating an example of a configuration of a known computer game apparatus.

FIG. 1 is a block diagram showing a configuration example of a computer game to which the image processing apparatus according to the present invention has been applied, and the members thereof which correspond with FIG. 9 are provided with the same reference numerals. In the embodiment, two of the disk reproducing devices 2 shown in FIG. 9 are provided, as disk reproducing device 2A and disk reproducing device 2B. The disk reproducing device 2A has a pick-up 3A, an amplifying circuit 4A, signal processing circuit 5A, host interface 6A, micro-computer 7A, and servo circuit 8A, these corresponding with the a pick-up 3, amplifying circuit 4, signal processing circuit 5, host interface 6, micro-computer 7, and servo circuit 8 of the disk reproducing device 2 shown in FIG. 9. Also, The disk reproducing device 2B has a pick-up 3B, an amplifying circuit 4B, signal processing circuit 5B, host interface 6B, micro-computer 7B, and servo circuit 8B, these corresponding with the a pick-up 3, amplifying circuit 4, signal processing circuit 5, host interface 6, micro-computer 7, and servo circuit 8 of the disk reproducing device 2 shown in FIG. 9.

Figure 2A:
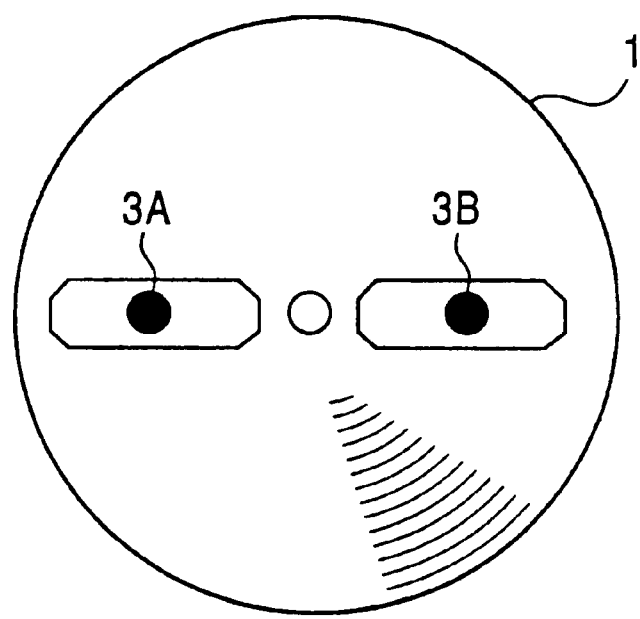
FIGS. 2A and 2B are diagrams illustrating the positioning of pick-up 3A and pick-up 3B shown in FIG. 1.
Figure 2B:
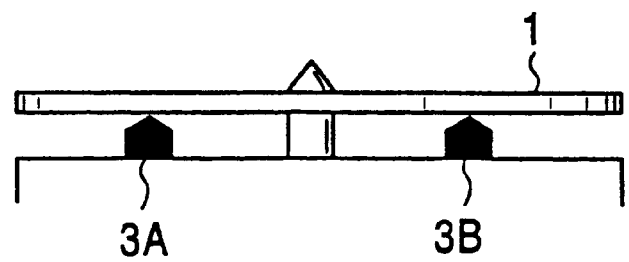

As shown in FIG. 2, the pick-up 3A and pick-up 3B are positioned 180° C. one to another across the rotational center of the CD-ROM 1. This is to prevent the operation of the pick-up 3A and pick-up 3B from interfering one with another.

Other configurations of the computer game apparatus are the same as with FIG. 9.

Next, the operation will be described. The user operating an unshown operating unit to instruct starting of a game causes the CPU 10 to instruct the disk reproducing device 2A via the host bus 9 to start reproducing the CD-ROM 1. The micro-computer 7a of the disk reproducing device 2A receives this instruction via the host interface 6A, and controls the servo circuit 8A to actuate the spindle servo, the focus servo, and the tracking servo. As a result, the CD-ROM 1 is rotated at a certain speed, the pick-up 3A is moved to a certain position, and the data recorded at the certain place on the CD-ROM 1 is reproduced.

The reproduced signals output from the pick-up 3A are supplied to the amplifying circuit 4A and amplified, then input to the signal processing circuit 5A and demodulated and then further decoded and subjected to error correction. The data output from the signal processing circuit 5A are supplied to the main memory 11 via the host bus 9 from the host interface 6A, and stored.

The CPU 10 reads the program data of the data stored in the main memory 11, and controls each unit according to the program. Of the data stored in the main memory 11, the graphics data is transferred from the graphics processor 12 to the graphics memory via the host bus 9, and stored. The graphics processor 12 processes the graphics data stored in the graphics memory 13, generates video signals, and outputs to an unshown CRT or the like.

Of the data stored in the main memory 11, the sound data is transferred via the sound processor 14 to the sound memory 15, and stored. The sound processor 14 processes the sound data stored in the sound memory 15, generates audio signals, and outputs to an unshown speaker or the like.

The CPU 10 controls the disk reproducing device 2B as the situation calls for, and causes the pick-up 3B thereof to read the certain data recorded at a certain position on the CD-ROM 1 in a similar manner.

The servo circuit 8B of the disk reproducing device 2B constantly actuates the tracking servo and focus servo, but does not actuate the spindle servo in the event that the disk reproducing device 2A is conducting reproducing operations. That is, in the event that both the disk reproducing device 2A and the disk reproducing device 2B are conducting reproducing operations, the spindle servo is controlled by the servo circuit 8A of the disk reproducing device 2A. The servo circuit 8B of the disk reproducing device 2B controls actuation of the spindle servo 8B in addition to the tracking servo and the focus servo in the event that the disk reproducing device 2A is not conducting reproducing operations.

FIG. 3 shows an example of operation of the pick-up 3A and pick-up 3B. In the example shown in FIG. 3A, at the time that the pick-up 3A is reproducing track $T_1$, the pick-up 3B is reproducing track $T_2$.

Now, the operation will be described with a specific example. This is a flowchart for describing a case wherein the first character (hereafter referred to as "character 1") has been slain and is to be replaced with the next opponent (referred to as "character 2"), in which the image is continued to be reproduced but the program is switched with that of character 2. First, in step S1, the CPU 10 respectively specifies the position $P_1$, of the head sector of the image data on the track $T_1$ to the micro-computer 7A, and the position $P_2$ of the head sector of the program data on the track $T_2$ to the micro-computer 7B, and instructs reading thereof.

In step S2, the micro-computer 7A controls the servo circuit 8A according to instructions from the CPU 10, and moves the pick-up 3A to position $P_1$ to reproduce the program image data of that sector recorded in the CD-ROM 1. The reproduced image data is read into the signal processing circuit 5A via the amplifying circuit 4A. In the same way, the micro-computer 7B controls the servo circuit 8B according to instructions from the CPU 10, and moves the pick-up 3B to position $P_2$ to reproduce the program data of that sector recorded in the CD-ROM 1. The reproduced program data is read into the signal processing circuit 5B via the amplifying circuit 4B.

In step S3, the micro-computer 7A notifies the CPU 10 once reading of the image data of the certain sector by the signal processing circuit 5A is completed. In the same way, the micro-computer 7B notifies the CPU 10 once reading of the program data of the certain sector by the signal processing circuit 5B is completed.

In step S4, the CPU 10 judges whether or not it was the micro-computer 7A that notified that reading has been completed (that generated interruption of reading). In the event that the CPU 10 judges that this is interruption from the micro-computer 7A, the flow proceeds to step S5. In step S5, the CPU 10 transfers the image data of the sector from the signal processing circuit 5A to the main memory 11.

In step S6, the CPU 10 transfers the image data transferred to the main memory 11 to the graphics memory 13 via the graphics processor 12. The transferred image data is read by the graphics processor 12, and following certain processing thereto, is output to an unshown CRT or the like.

Once the processing in step S6 is completed, the flow proceeds to step S7, and the CPU 10 judges whether or not to instruct reading of the next sector to the micro-computer 7A. In the event that judgment is made to instruct reading, i.e., in the event that judgment is made that the necessary image data has not yet been read into the graphics memory 13, the CPU 10 specifies the sector to be read next. Then, the flow returns to step S2, wherein the micro-computer 7A reads the image data of the sector specified by the CPU 10 into the signal processing circuit 5A. On the other hand, in the event that judgment is made that reading is not to be instructed, i.e., in the event that judgment is made that the necessary image data has been read into the graphics memory 13, the processing is completed.

On the other hand, in the event that judgment has been made by the CPU 10 in step S4 that there is no interruption from the micro-computer 7A, i.e., in the event that judgment is made that the interruption is from the micro-computer 7B, the flow proceeds to step S8. In step S8, the CPU 10 causes the program data of the sector to be transferred from the signal processing circuit 5B to the main memory 11. The transferred program data is read as necessary according to the CPU 10, and processed.

Once the processing in step S8 is completed, the flow proceeds to step S7, and the CPU 10 judges whether or not to instruct the micro-computer 7B of a next reading. In the event that judgment is made that there is the need to read, i.e., in the event that judgment is made that the program data necessary for operating the character 2 has not been transferred to the main memory 11, reading of the next sector is instructed. The flow then returns to step S2, wherein the micro-computer 7B reads the program data of the specified sector into the signal processing circuit 5B. On the other hand, in the event that judgment is made that reading is not to be instructed, i.e., in the event that judgment is made that the program data necessary for operating the character 2 has been read, the reading operation is completed.

As described above, the disk reproducing device 2A reproduces data from the CD-ROM 1 necessary for reproducing the moving image, and the disk reproducing device 2B reproduces data from the CD-ROM 1 necessary for exchanging the character, so the program can be replaced while continuing to reproduce moving images.

Figure 3A:
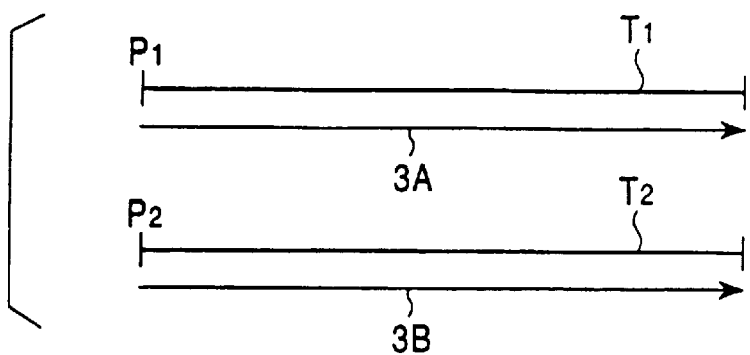
FIGS. 3A through 3D are diagrams illustrating the reproducing position of pick-up 3A and pick-up 3B shown in FIG. 1.

Also, the bus cycle of the host bus 9 is extremely short as compared to the reading cycle for reading from the CD-ROM 1, and the transfer operation via the host bus 9 is performed intermittently even while continuously reproducing the CD-ROM 1. Accordingly, even in the event that two pick-ups are reproducing simultaneously as shown in FIG. 3A, upon closer observation, transfer of reproduced data from the disk reproducing device 2A and transfer of reproduced data from the disk reproducing device 2B are conducted alternately on the host-bus 9, in a time-division manner.

Figure 5:
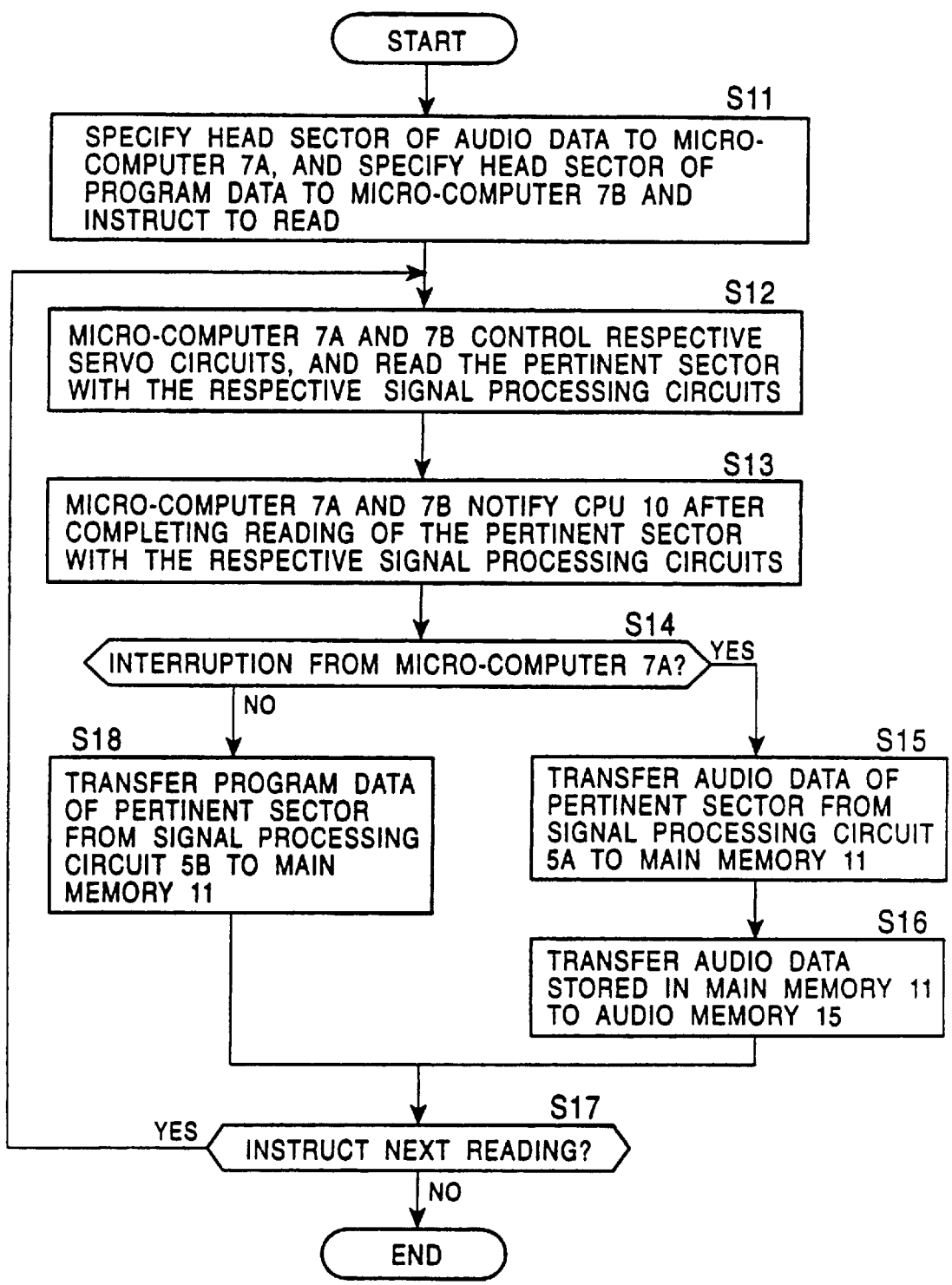
FIG. 5 is a flowchart describing other actions of pick-ups 3A and 3B in FIG. 3A.

FIG. 5 is a flowchart for describing another detailed example. Regarding this processing, and example will be described wherein, e.g., sound is continuously reproduced while the necessary program is exchanged at the changing of a scene which necessitates exchanging of a program.

In step S11, the CPU 10 respectively specifies the position $P_1$ of the head sector of the audio data on the track $T_1$ to the micro-computer 7A, and the position $P_2$ of the head sector of the program data on the track $T_2$ to the micro-computer 7B, and instructs reading thereof.

In step S12, the micro-computer 7A controls the servo circuit 8A according to instructions from the CPU 10, and moves the pick-up 3A to position $P_1$ to reproduce the audio data of that sector recorded in the CD-ROM 1. The reproduced audio data is read into the signal processing circuit 5A via the amplifying circuit 4A. In the same way, the micro-computer 7B controls the servo circuit 8B according to instructions from the CPU 10, and moves the pick-up 3B to position $P_2$ to reproduce to program data of that sector recorded in the CD-ROM 1. The reproduced program data is read into the signal processing circuit 5B via the amplifying circuit 4B.

In step S13, the micro-computer 7A notifies the CPU 10 once reading of the audio data of the certain sector by the signal processing circuit 5A has been completed. In the same way, the micro-computer 7B notifies the CPU 10 once reading of the program data of the certain sector by the signal processing circuit 5B is completed.

In step S14, the CPU 10 judges whether or not it was the micro-computer 7A that notified that reading of data has been completed. In the event that the CPU 10 judges that this is interruption from the micro-computer 7A, the flow proceeds to step S15. In step S15, the CPU 10 transfers the audio data of the sector from the signal processing circuit 5A to the main memory 11.

In step S16, the CPU 10 transfers audio data transferred to the main memory 11 to the sound memory 15 via the sound processor 14. The transferred audio data is read by the sound processor 14, and following certain processing thereto, is output to an unshown speaker or the like.

Once the processing in step S16 is completed, the flow proceeds to step S17, and the CPU 10 judges whether or not to instruct reading of the next sector to the micro-computer 7A. In the event that judgment is made to instruct reading, i.e., in the event that judgment is made that the necessary audio data has not yet been read into the sound memory 15, the CPU 10 specifies the sector to be read next. Then, the flow returns to step S12, wherein the micro-computer 7A reads the audio data of the sector specified by the CPU 10 into the signal processing circuit 5A. On the other hand, in the event that judgment is made that reading is not to be instructed, i.e., in the event that judgment is made that the necessary audio data has been read into the sound memory 15, the processing is completed.

On the other hand, in the event that judgment has been made by the CPU 10 in step S14 that there is no interruption from the micro-computer 7A, i.e., in the event that judgment is made that the interruption is from the micro-computer 7B, the flow proceeds to step S18. In step S18, the CPU 10 causes the program data of the sector to be transferred from the signal processing circuit 5B to the main memory 11. The transferred program data is read as necessary according to the CPU 10, and processed.

Once the processing in step S18 is completed, the flow proceeds to step S17, and the CPU 10 judges whether or not to instruct the micro-computer 7B of a next reading. In the event that judgment is made that there is the need to read, i.e., in the event that judgment is made that the program data necessary for the new scene has not been transferred to the main memory 11, reading of the next sector is instructed. The flow then returns to step S12, wherein the micro-computer 7B reads the program data of the instructed sector into the signal processing circuit 5B. On the other hand, in the event that judgment is made that reading is not to be instructed, i.e., in the event that judgment is made that the program data necessary for the new scene has been read, the reading operation is completed.

As described above, the disk reproducing device 2A reproduces data from the CD-ROM 1 necessary for reproducing the sound, and the disk reproducing device 2B reproduces data from the CD-ROM 1 necessary for changing the scene, so the program can be replaced without interrupting the sound.

Figure 4:
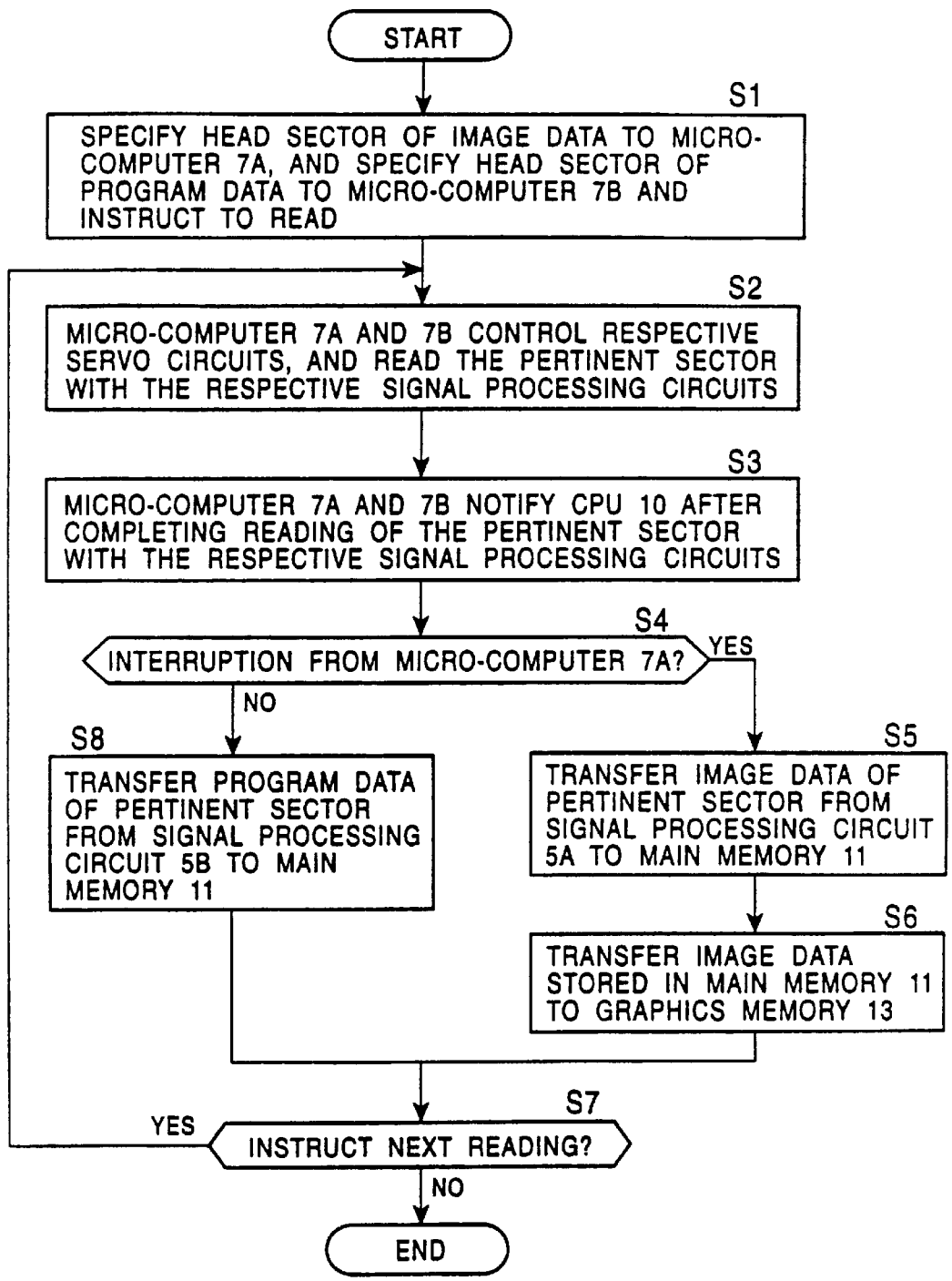
FIG. 4 is a flowchart describing the action of pick-ups 3A and 3B in FIG. 3A.

Although FIG. 4 shows image data and program data being reproduced with the disk reproducing devices 2A and 2B, and FIG. 5 shows audio data and program data being reproduced thereby, both disk reproducing devices 2A and 2B can be used for reproducing audio data. For example, an arrangement may be employed wherein the audio data for the background music of the game is reproduced with the disk reproducing device 2A and the audio data for the sound effects of the game is reproduced with the disk reproducing device 2B, the two sets of audio data being synthesized by the sound processor 14 and output to an unshown speaker.

Also, it is possible to reproduce image data with both disk reproducing devices 2A and 2B, e.g. an arrangement may be made wherein image data for character 1 is reproduced with the disk reproducing device 2A and image data for character 2 is reproduced with the disk reproducing device 2B, thereby allowing simultaneous reproducing even in the event that the image data for character 1 and character 2 are recorded on remote positions on the CD-ROM 1.

Figure 3B:
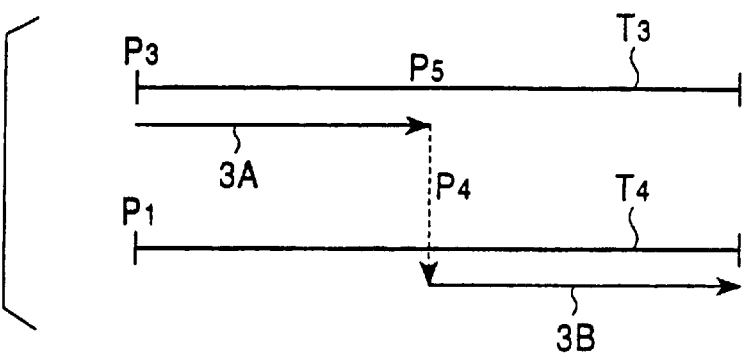
Figure 6:
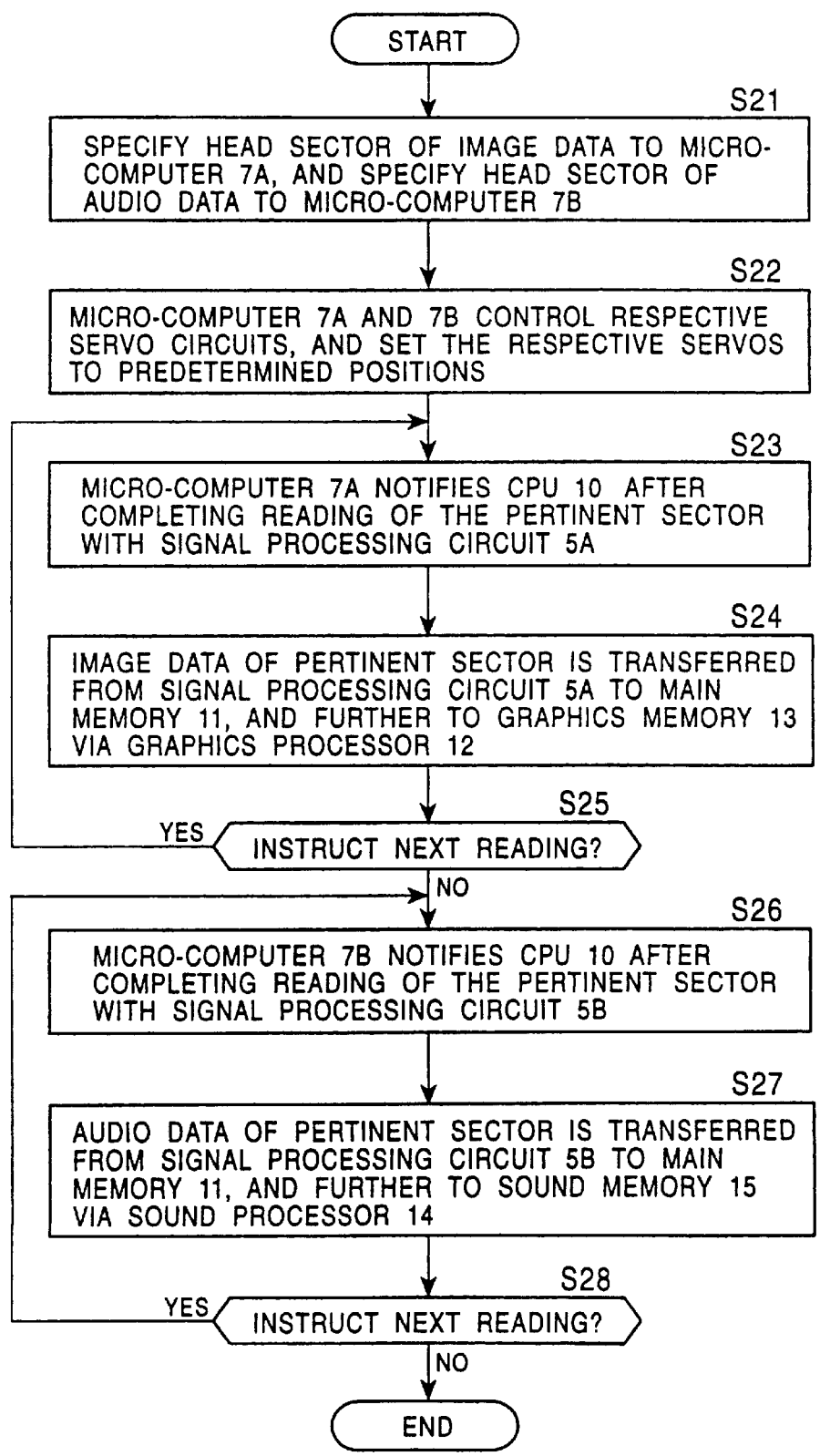
FIG. 6 is a flowchart describing the action of pick-ups 3A and 3B in FIG. 3B.

FIG. 3B represents another operational example of the pick-up 3A and pick-up 3B. For example, the image data and the audio data are recorded on remote positions on the CD-ROM 1, and description will be made of continuous reproducing thereof with reference to the flowchart shown in FIG. 6.

In step S21, the CPU 10 respectively specifies the position $P_3$ of the head sector of the image data on the track $T_3$ to the micro-computer 7A, and the position $P_4$ of the head data of the audio sector on the track $T_4$ to the micro-computer 7B.

In step S22, the micro-computer 7A controls the servo circuit 8A according to instructions from the CPU 10, and sets the pick-up 3A to position $P_3$, and the micro-computer 7B controls the servo circuit 8B and sets the pick-up 3B to position $P_4$.

In step S23, the micro-computer 7A notifies the CPU 10 once reading of the image data of the certain sector by the signal processing circuit 5A is completed. In step S24, the CPU 10 transfers the image data of the sector from the signal processing circuit 5A to the main memory 11. The CPU 10 the further transfers the image data to the graphics memory 13 via the graphics processor 12. The transferred image data is read by the graphics processor 12, and following certain processing thereto, is output to an unshown CRT or the like.

Once the processing in step S24 is completed, the flow proceeds to step S25, and the CPU 10 judges whether or not to instruct reading of the next sector to the micro-computer 7A. In the event that the CPU 10 has not read to position $P_5$ of track $T_3$ (the last sector of the necessary image data), the CPU 10 specifies the sector for the next reading. Then, in the event that reading has been instructed, the flow returns to step S23, wherein the micro-computer 7A reads the image data of the sector specified. On the other hand, in the event that judgment is made that reading has been made to position $P_5$ of track $T_3$, the flow proceeds to step S26.

In step S26, the micro-computer 7B notifies the CPU 10 once reading of the audio data of the position $P_4$ of track $T_4$ by the signal processing circuit 5B is completed. At the time of reading from the position $P_4$ of track $T_4$, the pick-up 3B has been set in the position $P_4$ of track $T_4$ beforehand, so switching between the image data and audio data which are located at separate locations can be performed instantly.

In step S27, the CPU 10 transfers the audio data of the sector from the signal processing circuit 5B to the main memory 11. The CPU 10 then further transfers the audio data to the sound memory 15 via the sound processor 14. Then in step S28, the CPU 10 judges whether or not to instruct reading of the next sector to the micro-computer 7B. In the event that judgment is made that the reading of the necessary audio data has not been completed, the CPU 10 instructs the next reading, and the steps from step S26 on are repeated. In the event that judgment is made that the reading of the necessary audio data has been completed, the processing ends.

Thus, by means of reproducing image data with the disk reproducing device 2A, and reproducing audio data which is located at a position removed from that of the image data with the disk reproducing device 2B, reproducing of audio data with the disk reproducing device 2B can begin instantly as soon as reproducing of the image data with the disk reproducing device 2A ends.

Figure 7:
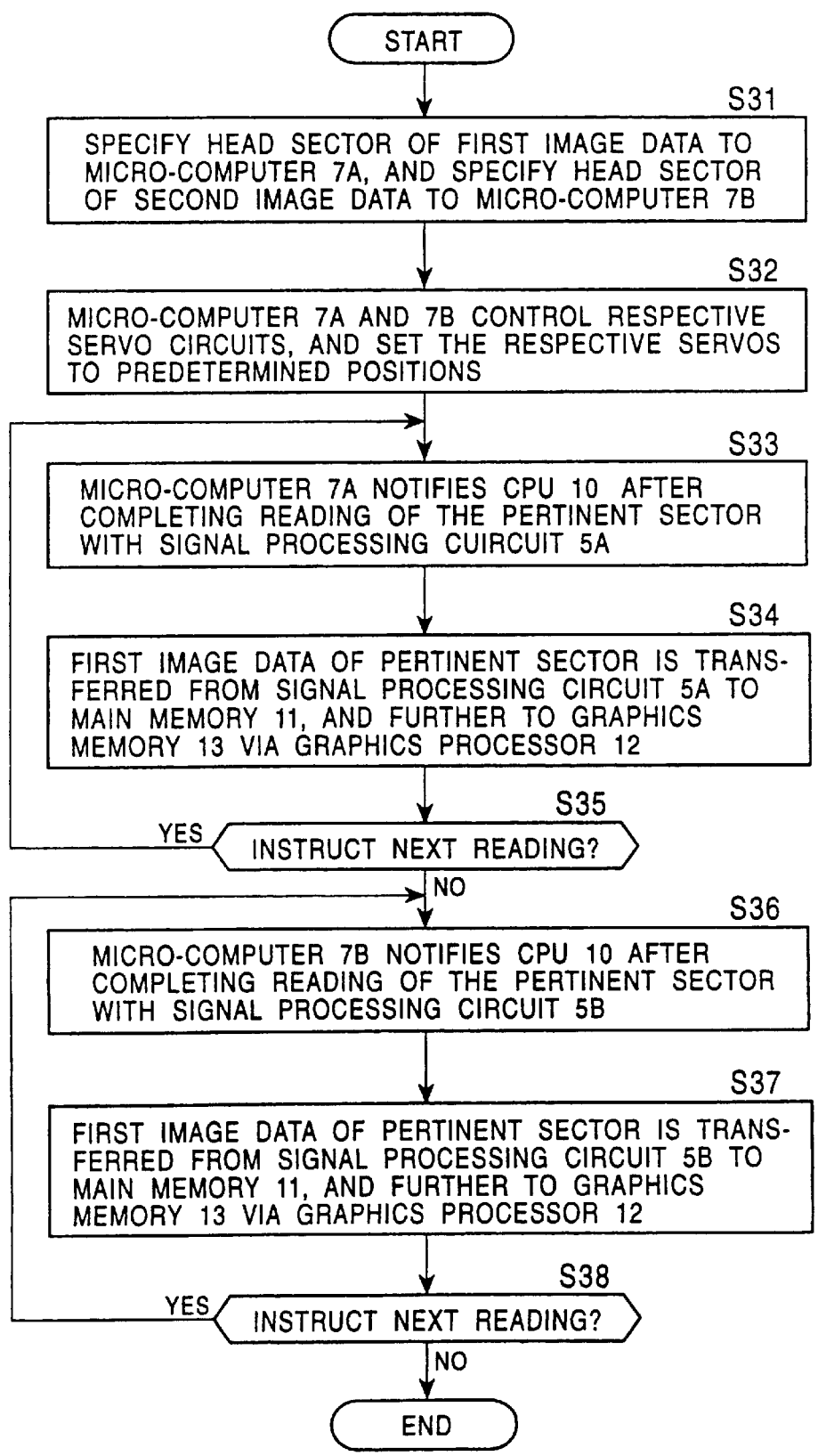
FIG. 7 is a flowchart describing other actions of pick-ups 3A and 3B in FIG. 3B.

FIG. 7 is a flowchart for describing another specific example in FIG. 3B. The processing shown in FIG. 7 will be described with an example of instantaneously switching to reproduce first image data and second image data which are recorded on separate and remote portions of the CD-ROM 1.

In step S31, the CPU specifies the position $P_3$ of the head sector of the first image data on track $T_3$ to the micro-computer 7A, and the position $P_4$ of the head sector of the second image data on track $T_4$ to the micro-computer 7B. In step S32, the micro-computers 7A and 7B respectively control the servo circuits 8A and 8B, and move the pick-ups 3A and 3B to the respective positions $P_3$ of track $T_3$ and $P_4$ of track $T_4$.

In step S33, the micro-computer 7A notifies the CPU 10 once reading of the first image data of the certain sector by the signal processing circuit 5A is completed. In step S34, the CPU 10 transfers the image data of the sector from the signal processing circuit 5A to the main memory 11. The CPU 10 then further transfers the image data to the graphics memory 13 via the graphics processor 12. The transferred first image data is read by the graphics processor 12, and following certain processing thereto, is output to an unshown CRT or the like.

Once the processing in step S34 is completed, the flow proceeds to step S35, and the CPU 10 judges whether or not to instruct reading of the next sector to the micro-computer 7A. In the event that the CPU 10 has not read to position $P_5$ of track $T_3$, the CPU 10 specifies the sector for the next reading. Then, in the event that reading has been instructed, the flow returns to step S33, wherein the micro-computer 7A reads the image data of the sector specified. On the other hand, in the event that judgment is made that reading has been made to position $P_5$ of track $T_3$, the flow proceeds to step S36.

In step S36, the micro-computer 7B notifies the CPU 10 once reading of the second image data of the sector by the signal processing circuit 5B is completed. At the time of starting to read the second image data, the pick-up 3B has been set in the position $P_4$ of track $T_4$ beforehand, so switching between the first image data and second image data can be performed instantly.

In step S37, the CPU 10 transfers the second image data which has been read from the signal processing circuit 5B to the main memory 11, and further to the graphics memory 13 via the graphics processor 12. The transferred data is read by the graphics processor as necessary, subjected to certain processing, and output to an unshown CRT.

In step S38, the CPU 10 judges whether or not to instruct reading of the next sector to the micro-computer 7B. In the event that judgment is made that the reading of the necessary second image data has not been completed, the CPU 10 instructs the next reading, and the steps from step S36 on are repeated. On the other hand, in the event that judgment is made that the reading of the necessary second image data has been completed, and there is no need to instruct reading of the next sector, the processing ends.

Figure 3C:
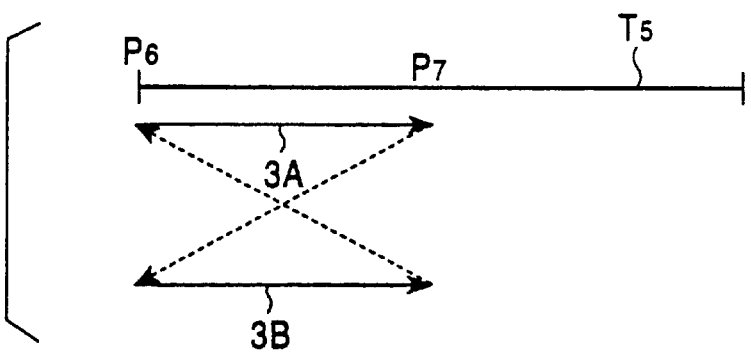
Figure 8:
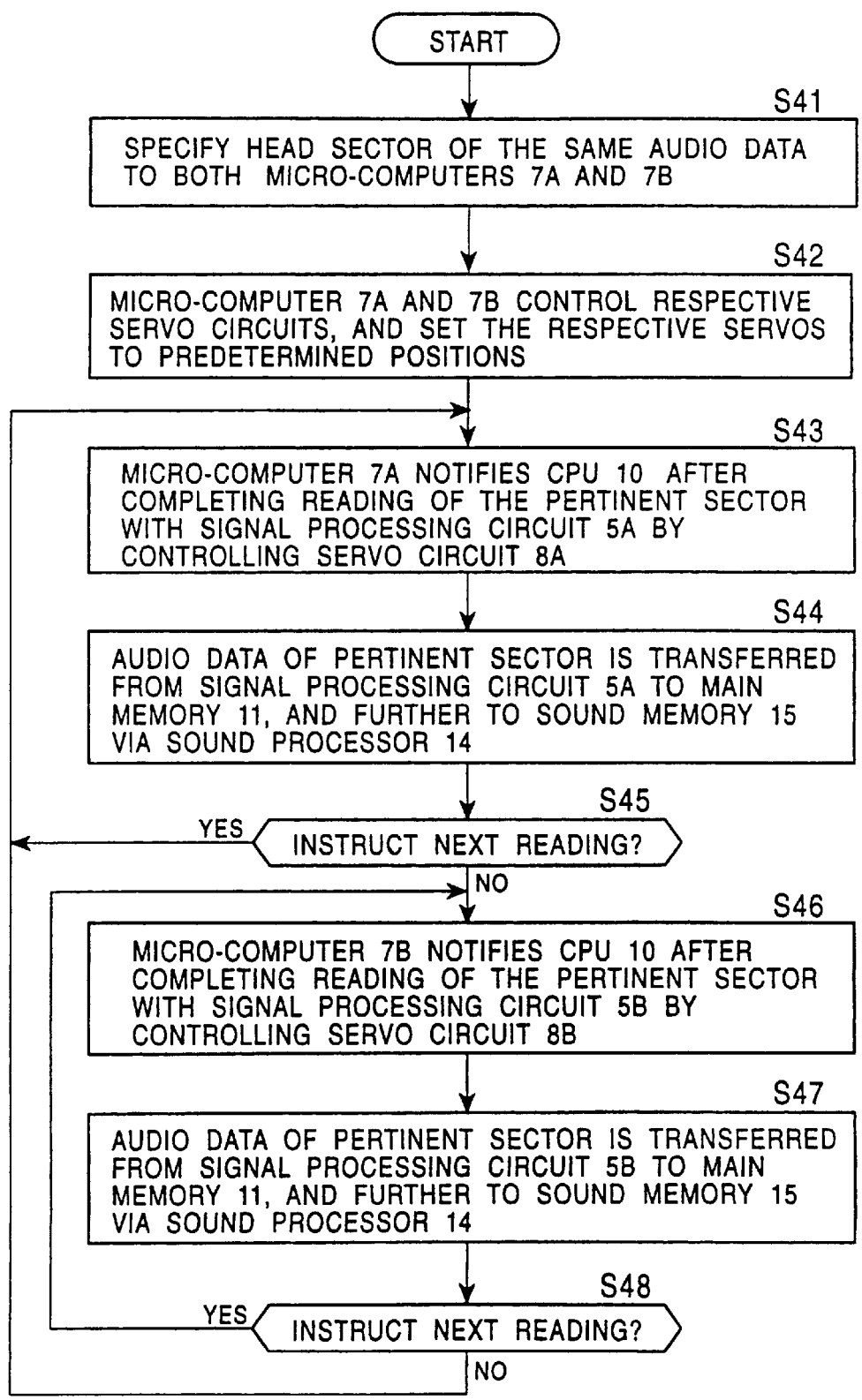
FIG. 8 is a flowchart describing the action of pick-ups 3A and 3B in FIG. 3C.

An example will now be described regarding the operation shown in FIG. 3C, such as for repeatedly reproducing short audio data as background music for a game. FIG. 8 is a flowchart for this example.

In step S41, the CPU 10 specifies the same position $P_6$ of the head sector of the audio data to micro-computers 7A and 7B. In step S42, the micro-computers 7A and 7B respectively control the servo circuits 8A and 8B, and move the pick-ups 3A and 3B to the position $P_6$ of the head sector of the audio data.

In step S43, the micro-computer 7A controls the servo circuit 8A to read the sector to the signal processing circuit 5A. The micro-computer 7A then notifies the CPU 10 once reading is completed.

In step S44, the CPU 10 transfers audio data read by the signal processing circuit 5A and transferred to the main memory 11 to the sound memory 15 via the sound processor 14. The transferred audio data is read by the sound processor 14, and following certain processing thereto, is output to an unshown speaker or the like.

In step S45, the CPU 10 judges whether or not to instruct reading of the next sector to the micro-computer 7A. In the event that the audio data has not yet been read to the position $P_7$ which is the final sector thereof, the CPU 10 specifies the sector for the next reading, and the steps from S43 are repeated. On the other hand, in the event that the audio data has been read to the position $P_7$ which is the final sector thereof, the flow proceeds to step S46. At this time, the CPU 10 again specifies to the micro-computer 7A the position $P_6$ of the head sector, specified in step S41. The micro-computer 7A controls the servo circuit 8A, and sets the pick-up 3A to the position $P_6$ of the specified head sector.

In step S46, the micro-computer 7B controls the servo circuit 8B to read the sector to the signal processing circuit 5B from the CD-ROM 1. At this time, in step S42, the pick-up 3B is already set at the position $P_6$ of the head sector beforehand, so there is no break in the background music when switching from audio data reading from the disk reproducing device 2A to the disk reproducing device 2B.

The micro-computer 7B notifies the CPU 10 once reading of the sector by the signal processing circuit 5B is completed. Then, in step S47, the CPU 10 transfers audio data read by the signal processing circuit 5B and transferred to the main memory 11 to the sound memory 15 via the sound processor 14. The transferred audio data is read by the sound processor 14, and following certain processing thereto, is output to an unshown speaker or the like.

In step S48, the CPU 10 judges whether or not to instruct reading of the next sector to the micro-computer 7B. In the event that the audio data has not yet been read to the position $P_7$ which is the final sector thereof, the CPU 10 specifies the sector for the next reading, and the steps from S46 are repeated. On the other hand, in the event that the audio data has been read to the position $P_7$ which is the final sector thereof, the flow returns to step S43. At this time, the CPU 10 again specifies to the micro-computer 7B the position $P_6$ of the head sector, specified in step S41. The micro-computer 7B controls the servo circuit 8B, and sets the pick-up 3B to the position $P_6$ of the specified head sector. Also, the pick-up 3A has already been set to the position $P_6$ of the specified head sector, and is in a state capable of immediately reading.

Thus, there is no break in the background music, since the disk reproducing device 2A and disk reproducing device 2B alternately reproduce the same audio data.

Figure 3D:
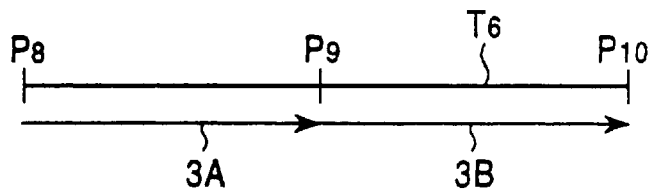

In the example shown in FIG. 3D, the pick-up 3A reproduces the data recorded in the track $T_6$ from position $P_8$, and the pick-up 3B reproduces from position $P_9$. Consequently, the data recorded from position $P_8$ to position $P_{10}$ on the track $T_6$ can all be read in half the time as compared to reading using only one pick-up.

For example, in the event of starting up a game, in many cases a large file must be read, so this arrangement is effective in such situations.

While the above embodiments have been described as using a CD-ROM, the present invention is by no means restricted to such; rather, various types of disk devices may be used to realize the present invention. Also, at least one of the fist reproducing unit and second reproducing unit may be a reproducing unit of a disk reproducing unit with upward-compatibility.

As described above, the image processing apparatus and image processing method according to the present invention is arranged such that the first reproducing unit and second reproducing unit reproduce data independently from one another, thereby enabling processing of motion image data changing at high speed, and speedily completing scene changes.

The present invention has been described above with reference to embodiments, but the present invention is by no means restricted to such; rather, it is needless to say that various changes and variations may be made in the invention without departing from the scope of the accompanying claims.

What is claimed is:

1. An apparatus for reproducing and processing data recorded on a disk, said apparatus comprising:
   a first reproducing unit operable to reproduce first data recorded on a primary surface of a disk, said first data including graphics data and/or audio data;
   a second reproducing unit operable to reproduce independently from said first reproducing unit second data recorded on said primary surface of said disk, said second data being related to said first data, said second reproducing unit reproducing said second data at a position relative to said disk which does not interfere with the reproduction of said first data by said first reproducing unit;
   a data processing unit operable to process said first and second data; and
   a control unit operable to control the reproducing operations of said first reproducing unit and said second reproducing unit.

2. An apparatus according to claim 1, wherein said data processing unit includes an audio processing unit operable to process audio data reproduced by said first or second reproducing unit.

3. An apparatus according to claim 1, wherein said first reproducing unit has a first pick-up operable to reproduce data from said primary surface of said disk and said second reproducing unit has a second pick-up operable to reproduce data from said primary surface of said disk;
   said first pick-up being positioned at a first position relative to said disk, and said second pick-up being positioned at a second position relative to said disk, such that said second pick-up reproduces a second track on said disk while said first pick-up reproduces a first track on said disk.

4. An apparatus according to claim 3, wherein said data reproduced by said first pick-up comprises graphics data, and said data reproduced by said second pick-up comprises program data.

5. An apparatus according to claim 4, wherein said program data comprises a program for interchanging a first object and a second object.

6. An apparatus according to claim 3, wherein said data reproduced by said first pick-up includes audio data, and said data reproduced by said second pick-up includes audio data.

7. An apparatus according to claim 3, wherein said data reproduced by both said first pick-up and said second pick-up is audio data.

8. An apparatus according to claim 3, wherein said data reproduced by both said first pick-up and said second pick-up is graphics data.

9. An apparatus according to claim 1, wherein said first reproducing unit has a first pick-up operable to reproduce data from said primary surface of said disk and said second reproducing unit has a second pick-up operable to reproduce data from said primary surface of said disk;
   said first pick-up being positioned at a first position relative to said disk, and said second pick-up being positioned at a second position relative to said disk, such that said second pick-up reproduces a second track on said disk after said first pick-up reproduces a first track on said disk.

10. An apparatus according to claim 9, wherein said data reproduced by both said first pick-up and said second pick-up is graphics data.

11. An apparatus according to claim 1, wherein said first reproducing unit has a first pick-up operable to reproduce data from said primary surface of said disk and said second reproducing unit has a second pick-up operable to reproduce data from said primary surface of said disk;

said first pick-up being positioned at a first position relative to said disk, and said second pick-up being positioned at a second position relative to said disk, such that said second pick-up reproduces a second track on said disk after said first pick-up reproduces a first track on said disk;

said first pick-up being again positioned at said first position relative to said disk, such that said first pick-up reproduces said first track on said disk after said second pick-up reproduces said second track on said disk.

12. An apparatus according to claim 11, wherein said data reproduced by both said first pick-up and said second pick-up is audio data.

13. An apparatus according to claim 1, wherein said first reproducing unit has a first pick-up operable to reproduce data from said primary surface of said disk and said second reproducing unit has a second pick-up operable to reproduce data from said primary surface of said disk;

said first pick-up being positioned at a first position relative to said disk, and said second pick-up being positioned at a second position relative to said disk, such that said second pick-up reproduces a second portion of a first track on said disk while said first pick-up reproduces a first portion of said first track on said disk.

14. An apparatus according to claim 13, wherein said reproducing operation is executed at the time of starting up said apparatus.

15. An apparatus according to claim 1, wherein said disk includes data for executing a video game.

16. An apparatus according to claim 1, wherein said data processing unit includes a graphics processing unit operable to process graphics data reproduced by said first or second reproducing unit.

17. A method for reproducing and processing data recorded on a disk, said method comprising:

reproducing first data recorded on a primary surface of a disk using a first reproducing unit, said first data including graphics data and/or audio data;

reproducing second data recorded on said primary surface of said disk using a second reproducing unit independently from said reproduction of said first data, said second data being related to said first data, said second reproducing unit reproducing said second data at a position relative to said disk which does not interfere with said reproduction of said first data by said first reproducing unit; and processing said data reproduced by said first or second reproducing unit.

18. A method according to claim 17, wherein said processing step processes audio data reproduced by said first or second reproducing unit.

19. A method according to claim 17, wherein said second reproducing unit reproduces a track at a second position on said disk while said first reproducing unit reproduces a track at a first position on said disk.

20. A method according to claim 19, wherein said data reproduced by said first reproducing unit comprises graphics data, and said data reproduced by said second reproducing unit comprises program data.

21. A method according to claim 20, wherein said program data comprises a program for interchanging a first object and a second object.

22. A method according to claim 19, wherein said data reproduced by said first reproducing unit includes audio data, and said data reproduced by said second reproducing unit includes audio data.

23. A method according to claim 19, wherein said data reproduced by both said first reproducing unit and said second reproducing unit is audio data.

24. A method according to claim 19, wherein said data reproduced by both said first reproducing unit and said second reproducing unit is graphics data.

25. A method according to claim 17, wherein said second reproducing unit reproduces a track at a second position on said disk after said first reproducing unit reproduces a track at a first position on said disk.

26. A method according to claim 25, wherein said data reproduced by both said first reproducing unit and said second reproducing unit is graphics data.

27. A method according to claim 17, wherein said second reproducing unit reproduces a track at a second position on said disk after said first reproducing unit reproduces a track at a first position on said disk;

and wherein said first reproducing unit reproduces said track at said first position on said disk after said second reproducing unit reproduces said track at said second position on said disk.

28. A method according to claim 27, wherein said data reproduced by both said first reproducing unit and said second reproducing unit is audio data.

29. A method according to claim 17, wherein said second reproducing unit reproduces a second portion of a first track on said disk while said first reproducing unit reproduces a first portion of said first track on said disk.

30. A method according to claim 29, wherein said reproducing operation is executed at the time of starting up said apparatus.

31. A method according to claim 17, wherein said disk includes data for executing a video game.

32. A method according to claim 17, wherein said processing step processes graphics data reproduced by said first or second reproducing unit.

* * * * *

UNITED STATES PATENT AND TRADEMARK OFFICE
CERTIFICATE OF CORRECTION

PATENT NO. : 6,205,101 B1  
DATED : March 20, 2001  
INVENTOR(S) : Furuhashi

Page 1 of 1

It is certified that error appears in the above-identified patent and that said Letters Patent is hereby corrected as shown below:

Column 2,  
Line 3, "Light" should read -- light --.

Column 3,  
Line 7, after "180°" delete "C".  
Line 17, "7a" should read -- 7A --.

Column 4,  
Line 6, after "$P_1$" delete ",".  
Line 13, before "image" delete "program".

Column 7,  
Line 3, "data" should read -- sector --.  
Line 4, "sector" should read -- data --.

Signed and Sealed this

Twenty-third Day of October, 2001

Attest:

NICHOLAS P. GODICI  
*Attesting Officer*    *Acting Director of the United States Patent and Trademark Office*